United States Patent
Agrawal et al.

(10) Patent No.: US 8,407,806 B2
(45) Date of Patent: Mar. 26, 2013

(54) DIGITAL DATA DISTRIBUTION DETECTION, DETERRENCE AND DISABLEMENT SYSTEM AND METHOD

(76) Inventors: Purusharth Agrawal, Austin, TX (US); Kevin W Schick, Scottsdale, AZ (US)

(*) Notice: Subject to any disclaimer, the term of this patent is extended or adjusted under 35 U.S.C. 154(b) by 1244 days.

(21) Appl. No.: 11/675,123

(22) Filed: Feb. 15, 2007

(65) Prior Publication Data

US 2008/0082827 A1 Apr. 3, 2008

Related U.S. Application Data

(60) Provisional application No. 60/827,580, filed on Sep. 29, 2006.

(51) Int. Cl.
*H04L 29/06* (2006.01)

(52) U.S. Cl. .................................. 726/29; 707/608

(58) Field of Classification Search .................. None
See application file for complete search history.

(56) References Cited

U.S. PATENT DOCUMENTS

| | | | | |
|---|---|---|---|---|
| 5,673,316 A | * | 9/1997 | Auerbach et al. | 705/51 |
| 5,987,572 A | * | 11/1999 | Weidner et al. | 711/155 |
| 6,807,534 B1 | * | 10/2004 | Erickson | 705/51 |
| 7,735,144 B2 | * | 6/2010 | Pravetz et al. | 726/30 |
| 2004/0230891 A1 | * | 11/2004 | Pravetz et al. | 715/511 |
| 2005/0234823 A1 | * | 10/2005 | Schimpf | 705/50 |
| 2006/0072144 A1 | * | 4/2006 | Dowling et al. | 358/1.15 |
| 2008/0082827 A1 | * | 4/2008 | Agrawal et al. | 713/176 |
| 2008/0272186 A1 | * | 11/2008 | Silverbrook et al. | 235/375 |
| 2010/0088233 A1 | * | 4/2010 | Tattan et al. | 705/50 |

* cited by examiner

*Primary Examiner* — Nathan Flynn
*Assistant Examiner* — Michael R Vaughan
(74) *Attorney, Agent, or Firm* — The Law Firm of H. Dale Langley, Jr., P.C.

(57) ABSTRACT

A method of distributing a data over a network includes protecting the data as a protected document by encryption and watermarking, controlling access to the protected document based on permissions, checking for permissions from a database, recording a record of the step of checking in the database, and accessing the protected document if allowed per permissions from the step of checking. The method collects a so-called "document thread" indicating a fingerprint of the first accessor of the data and the distributions and uses subsequently made of the data. The method is operable via a web page interface, such as through a browser of a device of the network communicatively connected to a web server of a data center. The method is alternately operable atop a document/ data management system, including a client device application of a device of the network communicatively connected to the document/data management system. The method provides detection and log of the protected data in each event of access by the device over the network, deterrence of inappropriate access to the protected data by the device through policies for the document and device and event recordation on access, and disablement of the protected data for access by the device if access is not permissible per the method.

12 Claims, 7 Drawing Sheets

DIGITAL DATA DISTRIBUTION DETECTION, DETERRENCE AND DISABLEMENT SYSTEM AND METHOD

CROSS-REFERENCE TO RELATED APPLICATION

The application is a conversion of U.S. Provisional Patent Application No. 60/827,580, filed on Sep. 29, 2006, and incorporated herein by this reference.

BACKGROUND OF THE INVENTION

The present invention generally relates to distribution of digital files and information and, more particularly, relates to digital data distribution and knowledge accumulation and security in such distribution, including by detection, deterrence and disablement through the distribution system and method.

Within a communicatively networked enterprise, such as a company or other organization, it is typically desirable that files and other digitized information be freely and readily available for access and distribution throughout the organization to those requiring the information to perform work and benefit the organization. The organization, however, may nonetheless have concern that information should not be inappropriately distributed or used. This presents a conflicting situation to organizations. Conventional security measures for digitized information restrict distribution, access, and usage of the information. These restrictions, however, counter needs of the organization that most information be readily available and useable for appropriate purposes.

Most information within an organization is not confidential or propriety; thus, the information need not be restricted or limited in accessibility or usage to an extent required to maintain strict secrecy and confidentiality. The organization may nonetheless wish to know who is accessing and using the information, whether and how it is being used, and if further distribution of or access to the information is made. Even such information that is not confidential or proprietary may preferably be only distributed and used in appropriate manner.

Conventional information security measures have been implemented in organizations to protect digitized information from access and use. These measures, because restrictive of access to and use of the information, disrupt and impede information flows within the organization. Since much of the information within the organization need not be so securely maintained, disruptions and impediments imposed through conventional information security measures are problematic. Organizations typically do not wish to discourage distribution and use of information that is needed for proper purposes. Yet, this can be the outcome of conventional information security measures that operate to restrict access and use.

Technologies that restrict digital information access and use include so-called "digital rights management" or "DRM". DRM refers to certain conventional technologies used for protection of digital content, such as consumer audio or audiovisual works and the like. DRM technologies conventionally encrypt data before distribution, and limit access to the encrypted data to only such end-users who acquire a proper license to access and use the data. DRM implementations tend to be complex, and they restrict distribution and usage. As has been mentioned, within an organization, restriction of accessibility and use is cumbersome and disruptive of normal and desired information flows through the organization for most types of information. Further, complexity of DRM implementation within an organization enterprise, and other similar conventional security measures, are not conducive to appropriate information distribution and usage in the enterprise and business environment.

Even though not ideal for use within business and similar applications where ease of access and use of information are often highly desirable, various schemes are presently implemented in networked organizations to limit or prevent access to and use of data. These schemes include DRM technologies, requiring that authorization licenses be obtained/granted for devices, users, and the like, in order to have permitted access to and use of information. Access and usage restrictions implemented with DRM schemes typically include: encryption of data that is to be accessed; obtaining of applicable license by devices/persons who desire to access and use the data; granting of unlock key for the encryption; network download or other access gathering of the data; and decryption by the end-user device/person via the key.

As mentioned, DRM is restrictive, complex, and management intensive. Multiple steps and procedures are required in order for an applicable end-user to gain access to and use of information. DRM tends, therefore, to impede distribution and use of information, even information that need not be confidentiality protected or otherwise highly secured and that is valuable and appropriate for access and use. Complexity of DRM implementations, as well as the managerial requirements, expense, and other problems associated therewith, render these conventional information security technologies less than suitable for the organization or enterprise.

The term "Enterprise Digital Rights Management" (E-DRM or ERM) has been used in some instances to refer to use of DRM technology to control access to corporate documents (Microsoft Word, PDF, and the like), as differentiated from DRM for consumer media. In the business environment, this E-DRM technology is essentially the same as DRM, and requires all of the steps and security/restriction aspects mentioned above. Like DRM, E-DRM also requires the complex and costly infrastructure and intensive management mentioned. E-DRM systems in the corporate environment can take years to implement across the enterprise. When implemented, distribution and normal information flows within the enterprise are impeded and disturbed. Even authorized information recipients within an organization or partner base, for example, must obtain authorizations, licenses, keys and the like. This usually requires user installations and/or appropriate equipment to gain the required rights and capabilities to access and use the E-DRM protected data. Infrastructure requirements likewise are extensive, and include rights management facilities, databases, and aspects, and management, security and oversight thereof.

In E-DRM implementations, information distribution by authorized persons, including further distributions by authorized recipients (such as internally in the enterprise to others who should have or need access), are even further restricted and limited by DRM and E-DRM security measures. Applicable rights to and for information must be obtained, installed and otherwise invoked for further distributions and by each recipient. Security protection afforded through these implementations can nonetheless be circumvented by unauthorized persons. Conventional DRM and E-DRM, therefore, are not suited for many environments, including particularly business organizations and enterprises and the like.

Knowledge about data and information distribution, and of usage of the distributed data, rather than restriction of access and use through DRM, can be advantageous to the enterprise in many situations. Within the enterprise, for example, most information in digital form is not so confidential as justifying restriction and complexity of DRM schemes. The information is preferably more easily distributable and usable. It can be important, however, to have knowledge of the access and use being made of the information, whether or not other protections are implemented. Conventional restrictive security measures, such as DRM, are not targeted to obtaining knowledge of distribution, access and use of data. Instead, the conventional measures focus on restricting distribution, access and use. In most enterprises and as to most information of the enterprise, knowledge of distribution, access and use can be more valuable and effective than more strict restrictions.

Particularly, detection, deterrence and disablement capabilities as to information distributed, accessed and used in the enterprise can provide significant advantages and benefits over DRM and other restrictive security schemes. It would, therefore, be a new and significant improvement and advance in the art and technology to provide distribution-knowledge and use-security for distributed digital data. Distribution and normal intended information flows are not significantly impeded or negatively affected through such measures, as with conventional technologies and practices. Moreover, such measures are more economical and less complex to implement and manage. The present inventions provide numerous advantages and improvements, including improvements and nuances in the foregoing respects.

SUMMARY OF THE INVENTION

An embodiment of the invention is a system for distribution of a data over a network. The system includes a content protector for encrypting and watermarking the data as protected data, an access controller for checking and reporting permissions to the protected data, a database communicatively connected to the content protector and the access controller, for maintaining information of the protected data from the content provider and the access controller, and the content protector and the access controller are communicatively connected to the network.

Another embodiment of the invention is a method of distributing a data over a network. The method includes protecting the data as protected data by encryption and watermarking, controlling access to the protected data based on permissions, checking for permissions from a database, recording a record of the step of checking in the database, and accessing the protected data if allowed per permissions from the step of checking.

Yet another embodiment of the invention is a method for distributing a document. The method includes detecting an event of access to the document in protected format by a data center, deterring inappropriate action with the document by denial of permissions by the data center and through the step of detecting the event of access, and disabling use of the document by denial of permissions.

Another embodiment of the invention is a system for distribution of a document by a data center to a device in communication with the data center. The system includes a database for tracking access to and use of the document, a content protector, connected to the database, for incorporating protections in the document prior to any access to the document by the device, and an access controller, connected to the database, for logging any access to the document by the device and reporting to the device any applicable permissions for the access by the device. The content protector encrypts and watermarks the document prior to any access to the document by the device, and calculates a first hash of the document and a second hash of the document after protections are incorporated. The access controller reports applicable access permissions, per policies dictated by the database, for the document and the device, to the device upon any access by the device to the document. The database, in conjunction with the access controller operates to compare a third hash of the document in any access by the device to the first hash and the second hash, in order to determine to report the applicable permissions. The applicable permissions allow the device to obtain a key to decode the document as encrypted, if access to the document is determined by the access controller, in conjunction with the database, to be appropriate for the device. The applicable permissions are not reported by the access controller to the device, if access to the document is determined by the access controller, in conjunction with the database, to be inappropriate for the device.

Yet another embodiment of the invention is a method of distribution of a document by a data center to a device in communication with the data center. The method includes tracking access to and use of the document by a database, protecting the document by a content protector connected to the database prior to any access to the document by the device, logging any access to the document by the device by an access controller connected to the database, and reporting to the device any applicable permissions for the access by the device by the access controller in communication with the database. The step of protecting includes encrypting the document and watermarking the document. The step of protecting also includes calculating a first hash of the document and a second hash of the document after the steps of encrypting and watermarking the document. The step of logging includes communication by the access controller to the database of an access to the document by the device and an identifier of the device. The method also includes calculating a third hash of the document as accessed by the device, and comparing the third hash to the first hash and the second hash to check that the document as accessed by the device is authentic and not altered. The step of reporting is dependent on a match result of the step of comparing. The step of reporting is also dependent on policies dictated by the database, in communication with the access controller, as to permissions for the document and the device. Further, the method includes obtaining a key by the device to decode the document at the device, if permissions for the document and the device are provided by the access controller, in conjunction with the database, in the step of reporting.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
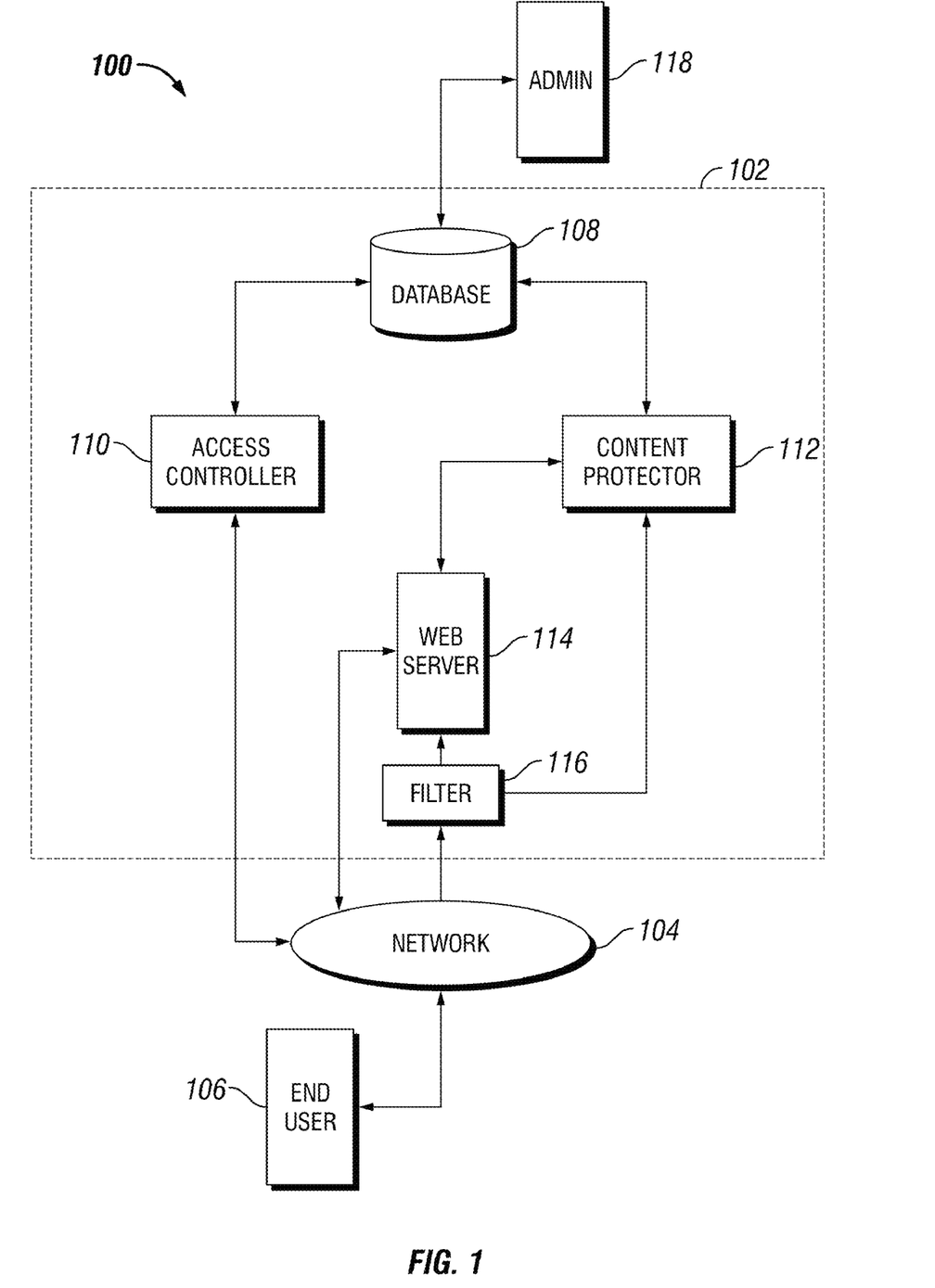
FIG. 1 illustrates a system for distributing a document over a network via a web site, by protecting the document and detecting distribution and use of the document, deterring unauthorized distribution and use, and disabling distribution and use of the document, according to certain embodiments of the invention.

Referring to FIG. 1, a data distribution system 100 includes a data center 102. The data center 102 is communicatively connected to a network 104. The network 104 is communicatively connected to an end-user computer 106. The network 104 is, for example, the Internet, an intranet, an enterprise network, local area network (LAN), wide area network (WAN), virtual private network (VPN), point-to-point connection, or any other connective data communications infrastructure and elements. The network 104 communicatively connects various communications devices (e.g., fixed or mobile), including other networks and other typical elements, including, for example, laptop computers, personal digital assistants, cellular data phones and devices, manager/management computers, IT professional/administrator communications devices, and others, mobile, immobile, virtual or otherwise. Links comprising the communicative connections of the various elements are, for example, wire, wireless, optical and other communicative connections and links.

The network 104 is a TCP/IP network or other data communications network operable over the particular communicative links and combinations, including intermittent trunk lines, local links, and other connections, servers, switches, routers and communications devices and elements. The network 104 is communicatively connectable to other and pluralities of communicative devices and links, in addition to the devices, elements and links shown in FIG. 1, and includes any and all other networked communications now or hereafter developed or deployed. Moreover, the network 106, itself, can be some dedicated, non-publicly accessible, restricted access, subscription, limited use, internal, and/or enterprise or other similar communications network. A company, branch or office location, division or other segment of a company, for example, can implement the system 100 internally within the company, via the company's communications systems, devices and networks or otherwise through dedicated systems.

In the following, each of the system 100, the data center 102, the network 104 and the end-user computer 106 are described with respect to certain particular embodiments; however, as those skilled in the art will readily know and appreciate, the description and embodiments are not, and are not intended as, exclusive or limiting to the options, alternatives and modifications that are possible. For example, reference is made to a single one of the end-user computer 106, however, typically a plurality of such computers are similarly connected and have communicative access through such connections in similar manners. Further, the end-user computer 106 is any communication device or element, fixed or mobile, that can communicate by communications link with and over the network 104, including, for example, laptop or desktop computer, personal digital assistant, data-enabled cell phone, and all others. Similarly, the network 104 can comprise multiple networks and types of networks of intercommunicative devices and elements, and network communications channels, links, protocols and media include all variations and possibilities. Pluralities and wide varieties of components, equipment, and communications links or vehicles can comprise the data center 102 and the network 104, and all of the various communicative arrangements now known and becoming known in the future are included. References made herein to particular devices, connections, equipment, and elements are intended as exemplary.

Two particular embodiments of the data distribution system are hereafter described: a web site implementation, such as would be operated by a web-accessible document protection web site of a company, third party protection provider, or other facility; and a web services application programming interface (API) implementation, such as can be operated by a company, enterprise or third party provider for incorporating data protection with document management systems.

Web Site Implementation:

Continuing to refer to FIG. 1, the data center 102 in a website implementation of the data distribution system 100 includes a database 108. The database 104 is any database application, software and/or hardware, having features, operability, and programmability for data storage/warehousing, and search and retrieval, for example, a software-implemented relational database application, such as SQLserver, mySQL, or Oracle. The database 108 includes or communicatively accesses sufficient memory, processing capability, and elements for input, storage, retention, maintenance, utilization, sorting, access, viewing, and update of digital data and information of the data center 102 in the application of the system 100. For example, the database 108 can be dedicated for collection of distribution and usage knowledge regarding data of the data center 102 by distributors and distributees. The database 108 similarly can operate to handle and maintain a wide variety of other data and digital information for an enterprise or company, or otherwise as may be applicable.

The database 108 is communicatively connected to an access controller 110 and to a content protector 112. Each of the access controller 110 and the content protector 112 are software and/or hardware that operate in conjunction with the database 108. A web server 114 is communicatively connected to the network 114. A filter 116 communicatively connects the web server 114 for receipt of data requests to the data center 102 from over the network 104, such as from the end-user computer 106. The web server 114 is one or more server computers or banks of servers, capable of communicating with the end-user computer 106 (in server-client, push and/or pull manners) over the network 104. The controller 110 and the protector 112 are operable on or by the web server 114, or either or both can alternately be operable by other processing elements or devices (not shown) of the data center 102. The filter 116 is hardware and/or software that assure security, firewall and the like, of the aspects of the data center 102 as so communicatively connected to the network 104. The filter 116 is likewise either included or incorporated in the server 114 or otherwise. Requests for data from the data center 102, made over the network 104 to the data center 102, such as by the end-user computer 106, are detected by the filter 116.

Other computing and communications devices can also be included or incorporated in the system 100. For example, the database 108 and other elements of the data center 102 are managed by an administrator computer 118 communicatively connected thereto. Of course, as will be understood, a wide variety of other, alternative, additional, and different elements, components, devices, and systems and networks thereof, are possible in the embodiments, including added or alternative aspects of the data center 102, database 108, server 114, filter 116, control and protection thereof and therefor, network 104 architectures and connections, as well as pluralities, hierarchies, and groups of end-user computing and communications devices.

In operation, the web server 114 serves to the end-user computer 106 over the network 106 a web page interface to the data distribution system 100. Although not detailed herein, conventional authentication and security measures are implementable to assure that the end-user computer 106 is to be permitted access to the data of the data center 102 through the web page interface. Assuming the end-user computer 106 is to be permitted to access the data center 102, the end-user computer 106 requests data, such as a document or the like, through the web page interface. The filter 116 detects the request for data from the end-user computer 106 and directs the request to the content protector 112. The content protector 112 communicates with the web server 114 to obtain the requested data and to apply data protections. The content protector 112 communicatively connects to the database 108, and operates in conjunction therewith, to appropriately protect the data (by encryption, watermarking, and association of a policy with the data), all per policies and implementations dictated for the data by the data center 102 (as later more fully described). The content protector 112 communicates the protected data to the web server 114, and the web server 114 serves the protected data over the network 104 to the end-user computer 106, such as over the web page interface, file transfer protocol (ftp) or otherwise.

Once the protected data is received by the end-user computer 106, the end-user computer 106 communicates over the network 104 to the access controller 110 of the data center 102 to determine applicable access permissions of and for the protected data. The access controller 110 communicates to, and operates in conjunction with, the database 108, to report the applicable permissions for the protected data to the end-user computer 106. Via the communications between the access controller 110 and the database 108, as well as from the protections implemented to the data by the content protector 112 in operation with the database 108, the database 108 maintains information of distribution and use of the protected data.

The particular policies, access and use protections, and permissions applicable to requested data are later further detailed. Generally, however, the system 100 and its operations serve to track and collect information of distribution, access and use of the particular distributed data, such as a file or document. The system 100 and its operations are not focused on the particular device, person, or recipient of the data, and whether or not applicable access and use licenses or rights are held by the device, person or recipient. Rather, the system 100 and its operations collect and make available knowledge (through reporting and the like) about device recipients of the data and uses made by such devices, including as to any further distributions.

In effect, the system 100 and its operations collect paths of data distribution as a so-called "document thread". The document thread tracks the data as to each step of distribution to a recipient device. Additionally, the document thread includes identifiers of each recipient device, such as a so-called "fingerprint" of the file and its distribution paths. Further, the data includes a "watermark" applied by the system 100 and its operations to the data/document itself. This watermark is incorporated in the data/document distributed to the first distributee device from the data center 102, and includes a start of thread indicative of original recipient device identification and encryption. The watermark is associated with the document thread information as to subsequent recipient devices by the data center 102 in the system 100 and its operations. Because of the fingerprint, watermark, and document thread, forensics, including document hash comparisons and others, are maintained by the system 100 and its operations, such as to ensure veracity of the data, proper distributions, appropriate access and usage, and the like.

Policies programmed for the data center 102 dictate the particularities of the fingerprint, watermark and document thread as to each respective data/document accessed. The policies as to particular data/document can additionally include a wide variety of access and use controls implemented in and for the data/document. For example, the document thread can be limited in extent of possible distributions, use, and otherwise, including such as limited number of accesses/uses of data/document, particular allowed distributees or groups or collections of distributes, shut-down of access or use of the data/document under applicable circumstances, and others. These features of the system 100 and its operations do not unduly restrict or impede information flows (provided more traditional document restrictions are not added, as can be possible for certain uses), and do not involve or require significant complexity, intensive management, and other limits and impediments. The system 100 and its operations thereby allow and provide detection, deterrence and disablement as to data/documents, but alleviate much of the problems of conventional technologies.

Figure 2:
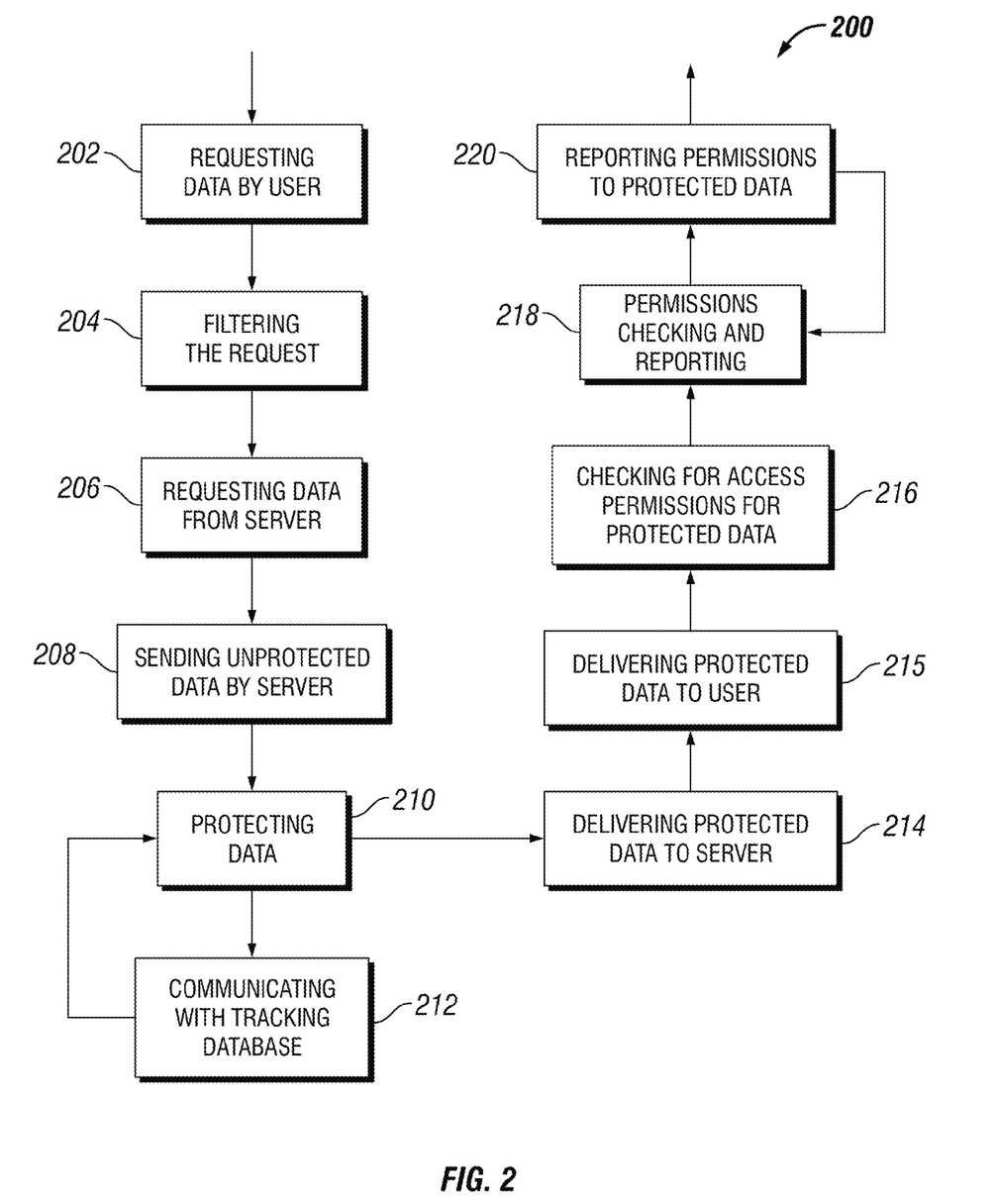
FIG. 2 illustrates a method for distributing a document over a network via a web site, by protecting the document and detecting distribution and use, deterring unauthorized distribution and use, and disabling distribution and use of the document, according to certain embodiments of the invention.

Referring to FIG. 2, in conjunction with FIG. 1, a distribution method 200 of the system 100 of FIG. 1 includes a step 202 of requesting. In the step 202, an end-user computer 106 having communicative connectivity to the data center 102, such as over the network 104, requests data from the data center 102. The data is any digitized file, information, program or other artifact or content maintained in data storage of the data center 102. In order to gain distribution-knowledge and use-security of the data, the data center 102 and system 100 operate in accordance with the embodiments herein. The request for data made in the step 202 is any client-server, file transfer protocol (ftp), or other type of request per the network 104 and its normal mode(s) for data communications on the network 104.

Upon receipt by the data center 102 of the data request communicated over the network 104 in the step 202, the filter 116 performs a step 204 of filtering the request. In the filtering step 204, the data center 102 detects that the data request is for a data that is to be protected in accordance with the embodiments. The step 204 of filtering, upon detection that the request is for data that should be protected based on data center policies for the applicable environment, communicates the request to the content protector 112. A step 206 of requesting the particular unprotected data from the server 114 is performed by the content protector 112. Upon the step 206, the server 114 sends the unprotected data to the content protector 112 in a step 208.

In a step 210, the content protector 112 protects the particular requested data. The protecting step 210 comprises, for example, watermarking, encrypting, fingerprinting, with secure hash of protected document and/or other protections of the data. Alternately or additionally, the protecting step 210 can include other presently known and future data protection and ear-marking measures. Additionally in the protecting step 210, a step of communicating 212 by the content protector 112 is performed with the database 108. The database 108 communications in the step 212 coordinate, between and among the database 108 and the content protector 112, the various protections for the data in the protecting step 210. Further, the communicating step 212 enables record and information maintenance by the database 212 as to the particular data requested, the protections applied thereto, the distribution intended for the requested data, and other information as is applicable to the end-user computer 106, the end-user's request and the particular subject, type and related attributes of the requested data.

After the step 210 of protecting the data is completed, a step 214 delivers the protected data to the server 114 for distribution. A step 215 of delivering the protected data to the end-user computer 106 that made the request for the data is performed by the server 114. The delivering step 215 is, for example, through communications of the server 114 to and with the end-user computer 112 over the network 104. Alternative modes or vehicles for the delivering step 215, such as copy to removable storage or the like, is possible as to the step 215. Network delivery is contemplated, however, for at least certain embodiments and applications.

Upon receipt of the protected data by the end-user computer 106 from the delivering step 215, the end-user computer 106 performs checking of the protected data for access permissions applicable for the protected data in a step 216. Checking of the protected data for permissions in the step 216 includes communication by the end-user computer 106 to the access controller 110 of the data center 102. The step 216 initiates a step 218 of permissions checking and reporting by the access controller 110. In the permission checking step 218, the access controller 110 signals to and communicates with the database 108 to check and report permissions applicable to the protected data. Through the step 218, the database 108 collects and obtains for maintenance all distribution and use information for the protected data. A step 220 reports permissions applicable to the protected data to the end-user computer 106. The communications between the end-user computer 106 and the access controller 110 occur, for example, over the network 104.

The end-user computer 106 then may view and/or use the protected data if permissions allowing such viewing and use apply to the protected data. Any further distribution of the protected data by the end-user computer 106, such as to other users, end-users, devices and the like, is similarly policed and tracked in the system 100, because of the nature of the protections and the permissions checking and reporting via the access controller 110. Each end-user or other recipient of the protected data must also invoke the steps 216, 218, and 220 as to the protected data. Through repetitions of the steps 216, 218 and 220 as to the protected data and each distribution and use thereof, the database 108 obtains and maintains all distribution and use information for the protected data. The distribution and use information is viewable and reportable, such as by IT administrators, managers, or others allowed such information, and distribution-knowledge and use-security for the protected data is thereby collected and maintained by the system 100 and method 200.

Figure 3:
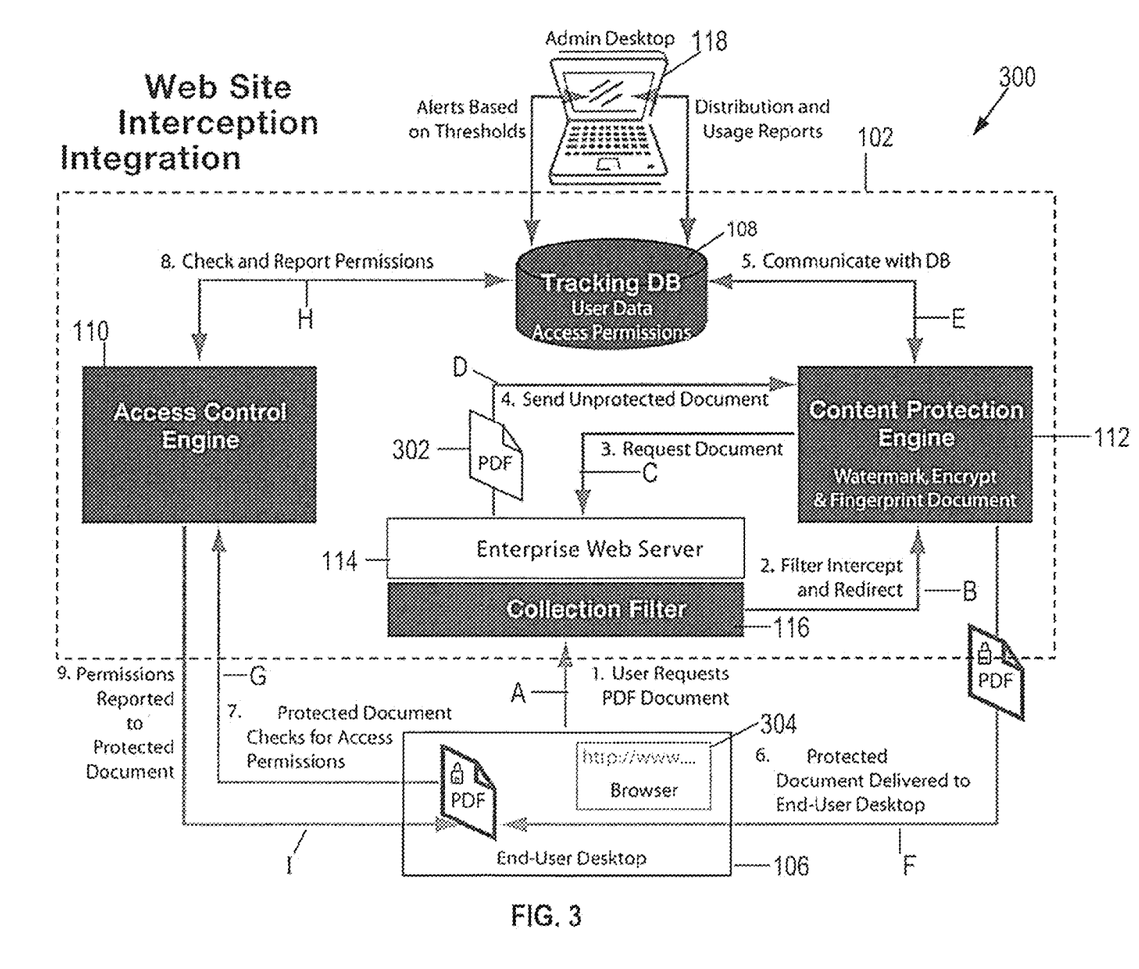
FIG. 3 illustrates functional components for distribution of a document over a network, including protecting the document and detecting distribution and use, deterring unauthorized distribution and use, and disabling distribution and use of the document, according to certain embodiments of the invention.

Referring to FIG. 3, in conjunction with FIGS. 1 and 2, functional processes 300 of various components and steps of the system 100 and method 200 are described. A web site for protected document distribution is accessed by the web browser of the end-user computer 106. At the web site, the computer 106, via input of a user or application at the computer 106, makes request on the web site for a protected document (or other data) available at the data center 102, such as a Portable Document Format file (i.e., PDF or pdf herein) 302 in FIG. 3, in a first communication (A) by the computer 106 to the data center 102 over a connected network (not shown in detail in FIG. 3; shown in FIG. 1) or the like. The first communication (A) is received by the data center 102 at the collection filter 116. The collection filter 116 in a second communication (B) delivers the request to the content protector 112.

The content protector 112 processes the document request indicated from the collection filter 116, and requests the particular document of the request from the server 114 in a third communication (C). The server 114 serves the unprotected document to the content protector 112 in a fourth communication (D). Although not shown in FIGS. 1-3 in detail, it is to be understood that the data center 102 includes various document and data storage and facilities. The server 114 and, as applicable, other data center 102 features, connect to such storage and facilities, and the data center 102 includes appropriate processing and communications features such that the server 114 has access to and serves the unprotected document to the content protector 112. The content protector 112, in processing the unprotected document for protection, communicates with the database 108 in a fifth communication (E). This fifth communication (E) provides to the database 108 various details of the protections being processed for the document by the content protector 112, and also directs the content protector 112 in processing appropriate and desired protections for the document. Policies and rules programming of the database 108, together with operations of the content protector 112, protect the document for distribution in the protected form. For example, as previously mentioned, document protections can include watermark, encryption, fingerprinting, with secure hash of protected document for store in the database 108, and others for the document.

Once the requested document is protected by the content protector 112, the protected document is delivered by the data center 102 to the end-user computer 106. A sixth communication (F) delivers the protected document, such as over the network. The delivery by the communication (F) is through the web site or as otherwise applicable in the arrangement. The protected document, as delivered to the end-user computer 106, then checks for access permissions from the data center 102 in a seventh communication (G). This seventh communication (G) can also occur over the network, by the end-user computer 106 to the access controller 110 of the data center 102. The access controller 110 then performs an eighth communication (H) with the database 108, to check and report permissions for the protected document. This eighth communication (H) provides to the database 108 relevant details about the protected document, its distribution and recipient(s), and other aspects of distribution and use of the protected document. The applicable permissions are then reported to the protected document, in communications of the access controller 110 and to the end-user computer 106.

Specific modes of communications and pathways for communications and signals are not detailed in the foregoing description of FIG. 3, however, all possibilities are included in keeping with the embodiments. As will be understood, the server 114 of the data center 102, alone or in combination with other devices and aspects, handles communications over the network and the web site in the usual embodiment. Within the data center 102, server and communications equipment and facilities (not shown in detail) handle communications over the network 104 between the end-user computer 106 that receives the protected data and the access controller 110. Moreover, copy transfer of the protected data to removable media or the like at or in connection with the data center 102 and all other variations are included.

The collection filter 116, the content protector 112, and the access controller 110 are implemented in software and/or hardware. The functions of these devices can be performed on the same, different or combinations of processors and processing devices, and associated memory, storage and the like are similarly subject to variation. The database 108 is implemented in software and/or hardware, and provides capabilities for storage, sorting, retrieval and other manipulations of tracking and use information for protected data distribution by the data center 102.

An administrator computer 118, or other management device and software for the database 108 and/or pluralities thereof, sets policies and rules for the tracking and usage, as well as the protections that are applied by the content controller 112 to data content to be distributed. Various reports, alerts, alarms and other oversight and management controls operate on the administrator computer 118 to allow management of the database 108 and the system 100 and method 200 thereof. Policies, as to data distribution and access, protections, permissions and the like, are set at the administrator computer 118, such as by a data center monitor or administrator.

The end-user computer 106 communicates over the network 104 with the data center 102, for example, via a website browser 304 software of the computer 106. The website browser 304 contacts the server 114 according to applicable network and browser protocols and commands. The server 114 serves to the end-user computer 106 for display in the browser 304 the web page interface to the data center 102. As mentioned, authentication and security measures are not detailed here, but can be implemented to ensure authorized end users. Requests for data and documents, as well as other communications of the computer 106 with the server 114, occur through the interface to the browser 304.

In operation by a user of the end-user computer 106, an input is made to communicate via the browser 304 with the server 114. Upon display at the end-user computer 106 of the web page interface from the server 114, the interface allows the user to input at the end-user computer 106 the request for data/document, as previously described. Once the user inputs the request to the end-user computer 106 and sends or otherwise communicates the request to the server 114, the collection filter 116 intercepts and redirects the request to the content protector 112. Thereafter, the data center 102 performs its document protections and database collection and recordation of the document particulars, and returns communications of the protected document to the end-user computer 106 responsive to the document request.

The protected document, in further communications of the end-user computer 106 on receipt of the protected document, checks access permissions for the document with the data center 102. The access controller 110 determines the permissions, in conjunction with the database 108 operations and recording of protected document particulars per the distribution, reports applicable permissions for the protected document. At the end-user computer 106, the protected document can be manipulated per the permissions applicable to the protected document. For example, viewing, printing, copying and other actions at the end-user computer 106 may be permitted per the rules and policies for the protected data (as dictated by the system policies).

If the protected document is further distributed by the end-user computer 106, then the protected document continues to have applicable permissions as dictated by the data center 102; and the permissions in each instance of access and use of the protected data (whether by the end-user computer 106 or otherwise, and as applicable according to the dictated policies of the system) must be checked from and reported by the access controller 110 of the data center 102. This creates the so-called "document thread" that allows for detection, deterrence and disablement of the document, as has been mentioned. For example, the protected document may allow for distribution with similar permissions or with only certain of the permissions. Further, wide variations of permissions are possible for the protected document, including different, subsets, supersets and so forth of permissions. Moreover, rules and policies invoked via the permissions can limit time periods for further distribution, access or other actions by the end-user computer 106, and each other end-user as applicable, and/or as otherwise set for the protected document. In fact, protections of the document can disable all or certain use, access or distribution, as applicable per rules and policies for the protected document.

Figure 4:
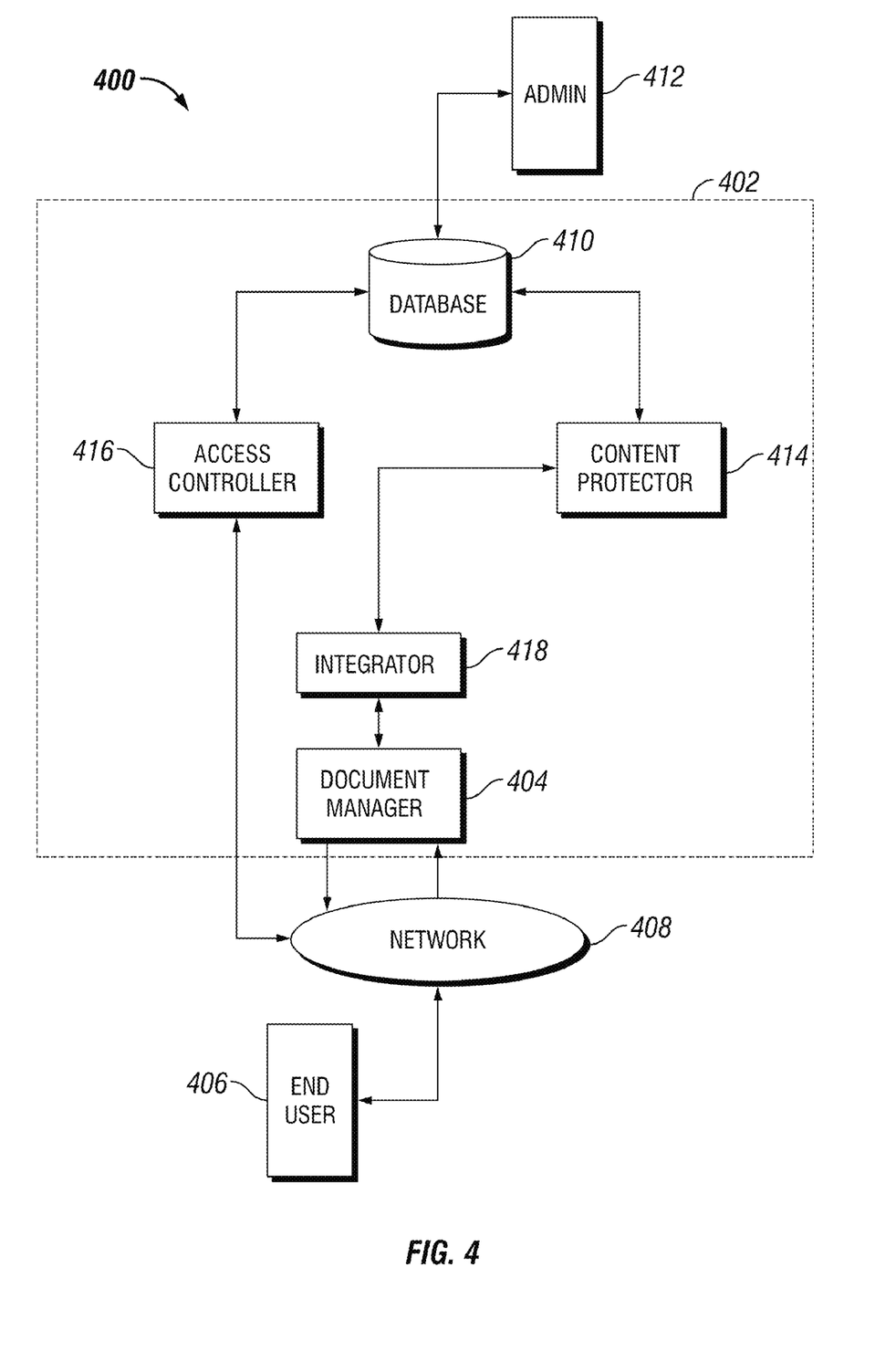
FIG. 4 illustrates a system for distributing a document over a network via a client application interfacing a document management system, by protecting the document and detecting distribution and use of the document, deterring unauthorized distribution and use, and disabling distribution and use of the document, according to certain embodiments of the invention.

Web Services API Implementation:

Referring to FIG. 4, an alternative data distribution system 400 of a web services API implementation includes a data center 402 comprising a document manager 404. At least one user computer 406 is connected to the data center 402 by a network 408. The network 408 is any communications network and links, as has been described. The data center 402 may be housed internally within a business or the like, and the network 408 can allow appropriate access to data of the data center 402 by the user computer 406 (and pluralities thereof, as applies) from internally within a company, over a wider or enterprise network, or otherwise. The user computer 406, as previously has been described, can be any of a wide variety of communicatively connected communications devices (e.g., fixed or mobile).

The data center 402 includes a document manager 404. The document manager 404 is any present or future document management or content management system, comprised of software and/or hardware, and includes all commercial as well as proprietary systems. Such content management systems have also been variously referred to as Enterprise Content Management Systems, Digital Asset Management and the like, and are presently available as integrated data solutions from a variety of sources such as IBM, Xerox, Adobe, and others. The management systems permit tracking and storage of electronic content, documents, images and other digitized information, such as in an enterprise or networked group. The information via the management systems is made accessible to devices that are authenticated for use of the systems. The data distribution system 400 integrates these commercial or proprietary document and data management systems, by interfacing therewith in the data center 402.

The data center 402 of the data distribution system 400 includes a database 410. The database 410 is administered by an administrator computer 412 communicatively connected to the data center 402. The database 410 is as previously described (as to the data center 102 of FIG. 1), and may be the same as or different than any database or store comprising or associated with the document manager 404. The database 410 includes features of search, retrieval and the like. The database 410, via the administrator computer 412, is programmed to maintain and report information about data distribution and usage in the data distribution system 400.

The database 410 is communicatively connected to a content protector 414 and an access controller 416. The content protector 414 is substantially as previously described (as to the data center 102 of FIG. 1), and includes software and/or hardware that operate in conjunction with the database 410 when data of the data center 402 is accessed from the network 104, such as by the user computer 406. The access controller 416 is also substantially as has been described (with respect to FIG. 1), and also includes software and/or hardware for operation with the database 410 to check access permissions for data that is obtained, for example, by the user computer 406, from the data center 402 over the network 408.

The data center 402 includes an integrator 418 communicatively connected to the content protector 414 and the access controller 416. The integrator 418 is also communicatively connected to the document manager 404. The integrator 418 interfaces the content protector 414 and the access controller 416 to the document manager 404. As mentioned, proprietary and commercial document management systems are operable in the data center 402 of the distribution system 400. The integrator 418 is programmable to interface with a wide variety of document management systems as the document manager 404, and to enable the distribution system 400 to operate in conjunction with the management systems.

The document manager 404 communicatively connects to the network 408, such as through connected network servers and communications facilities (not shown in FIG. 4). In the arrangement of the distribution system 400, the integrator 418, in essence, operates atop the document manager 404. The integrator 418 communicates with the document manager 404 to intermediate between the document manager 404 and the content protector 414 for inclusion of applicable protections in requested documents. As previously described regarding FIG. 1, the content protector 414, in conjunction with the database 410, incorporates protections into documents prior to distribution beyond the data center 402. The communicative connection of each of the document manager 404 to the integrator 418, and the integrator 418 to the content provider 414, allow the content protector 414 to incorporate in the requested document the applicable protections. The content protector 414 communicatively connects with the database 410 to apply and register applicable protections to the document per dictated policies for distribution and usage information collection by the system 400.

In operation, the user computer 406 requests data by communicating the request for data over the network 408 to the document manager 404. Prior to the requested data being pushed to (or pulled by, as applicable) the user computer 406, the data is communicated to the integrator 418 by the document manager 404. The integrator 418 directs the data to the content protector 414 for incorporation of protections thereby (e.g., encryption, watermarking, fingerprinting, with secure hash of protected data, etc.). The content protector 414 returns the protected data to the integrator 418, and the integrator 418 communicates the protected data for the document manager 404 in order to deliver the protected data over the network 408 to the user computer 406. As previously described with respect to FIGS. 1-3, the content protector 414 communicatively coordinates to and with the database 410 various information of parameters and characteristics of the then-requested data and its appropriate protections, to allow collection by the distribution system 400 of information of distribution and usage of the protected data (i.e., to create, maintain and report the "document thread" as applicable to the data so accessed and used).

The protected data at the user computer 406 checks for access permissions, by communication over the network 408 to the access controller 416 of the data center 402. The access controller 416 communicates information of the distribution and access to the database 410. The database 410 and access controller 416 communicatively coordinate applicable permissions for the protected data, as set per policies of the data center 402. The access controller 416 reports the permissions for the protected data over the network 408, to the user computer 406.

The permissions apply policies for the protected data as to viewing, use, further distribution and the like. The protections for the protected data are as applied and incorporated in the protected data per the coordinated operations of the content protector 414 with the database 410. The access controller 416, via the check by the protected data for permissions applicable, coordinates operations with the database 410 to report the permissions and to collect use and distribution information for the protected data for maintenance by the database 410. Protections and permissions are as set by policies of the data center 402, via an administrator computer 412 connected to the database 410. The document thread for the data, as accessed, used and distributed in the system 400, allows for detection, deterrence, and disablement as described.

Figure 5:
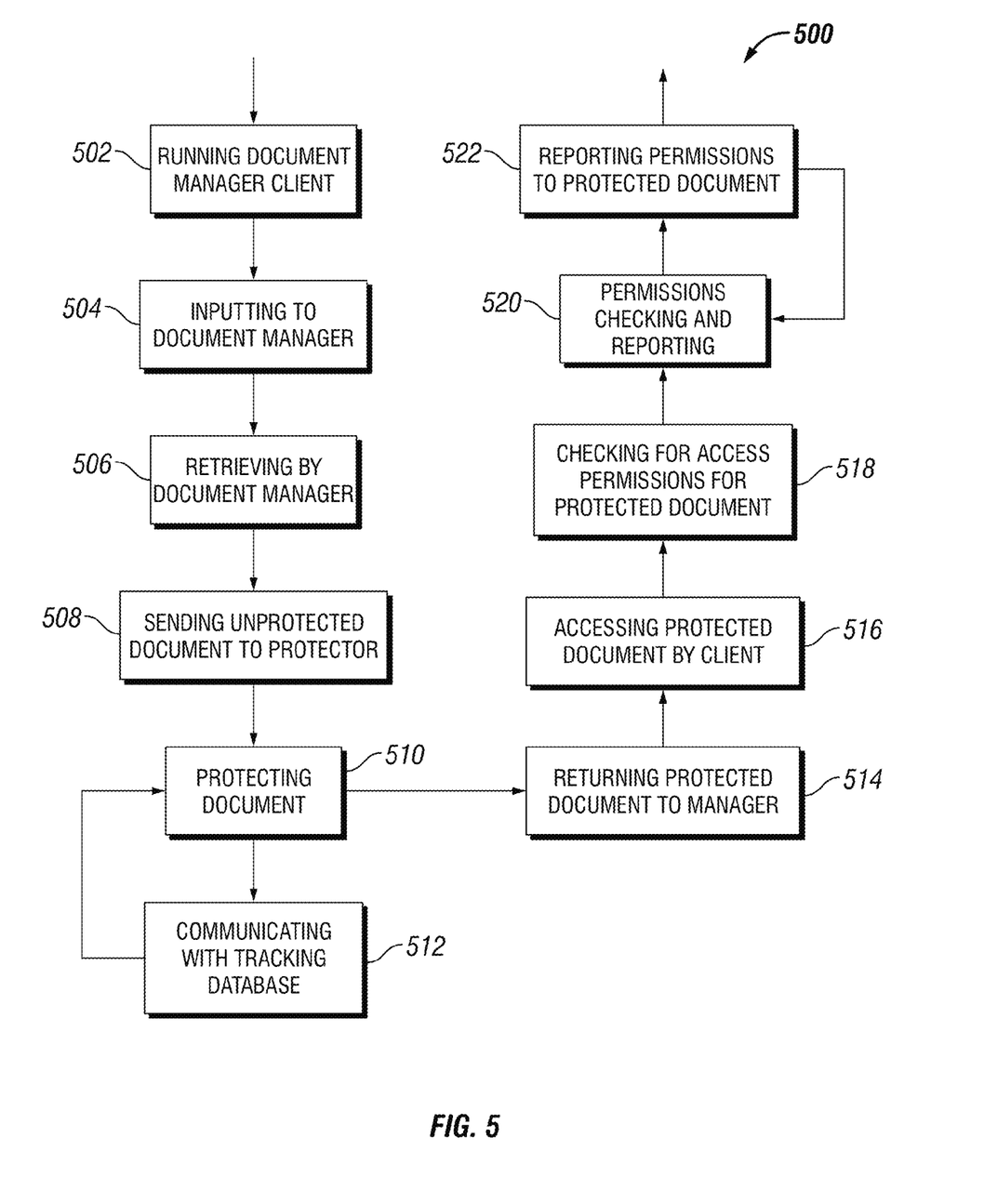
FIG. 5 illustrates a method for distributing a document over a network via a client application interfacing a document management system, by protecting the document and detecting distribution and use of the document, deterring unauthorized distribution and use, and disabling distribution and use of the document, according to certain embodiments of the invention.

Referring to FIG. 5, in conjunction with FIG. 4, an alternative distribution method 500 of web services API implementation of the system 400 of FIG. 4 includes a step 502 of running a manager client application of the user computer 406. The manager client application is software and/or hardware capable of accessing and requesting data from the document manager 404 of the data center 402. For example, the step 502 operates the user computer 406 to communicate a request, conforming to a document retrieval interface of the document manager 404, for particular data managed by the document manager 404. The request is communicated over the network 408 or other communications link. Although not specifically shown in FIGS. 4-5, the document manager 402 and data center 402 can include equipment, facilities, processes and operations for document management and communicative access and retrieval of data thereof. The data center 402, including the document manager 402, can include relevant authorization and security measures to ensure authorized access by the user computer 406 via the manager client application.

On running the manager client application in the step 502, the user computer 406 performs a step 504 of inputting a request for data from the data center 402. In the step 504, a user or application of the user computer 406 inputs the request to the user computer 406, via input device thereto, and communicates the request over the network 408 to the document manager 404. The document manager 404 receives the request from the network 408 and commences retrieving the requested data in a step 506. The document manager 404 operates in accord with its usual operations.

The integrator 418 connected to the document manager 404 intercepts the unprotected data from the document manager 404 in a step 508. In the step 508, the interface of the integrator 418 sends the unprotected data from the document manager 404 to the content protector 414. The unprotected data is not then made available by the document manager 404 to the user computer 406. Rather the content protector 414, in a step 510, incorporates data protections to the data. In conjunction with protecting the data in the step 510, the protector 414 communicates in a step 512 with the database 412. In the step 512, the particular protections, according to dictated policies, are implemented based on programming of the database 410 and applicable information of the data, protections and distribution are collected and stored in the database 410.

The protected data, in a step 514, is then returned via the content protector 414 and the integrator 418 to the document manager 404. A step 516 of accessing the protected data is performed by the user computer 406 through the manager client application in conjunction with the operations of the document manager 404. The protected data at the user computer 406 checks over the network 408 for applicable permissions at the access controller 416 in a step 518.

The access controller 416 communicates with the database 410 in a step 520 to check permissions of the distribution and use of the protected data. The database 410 collects and maintains information regarding the protected data, the distributee, and the use and distribution, as has been discussed. In a step 522, applicable permissions are reported by the access controller 416 over the network 408 for the protected data. As with the systems and methods of FIGS. 1-3, the system 400 and method 500 obtain and collect information of any further use and distribution in similar manner. The collected information, i.e., document thread, of the data affords the detection, deterrence and disablement operations via the method 500.

Figure 6:
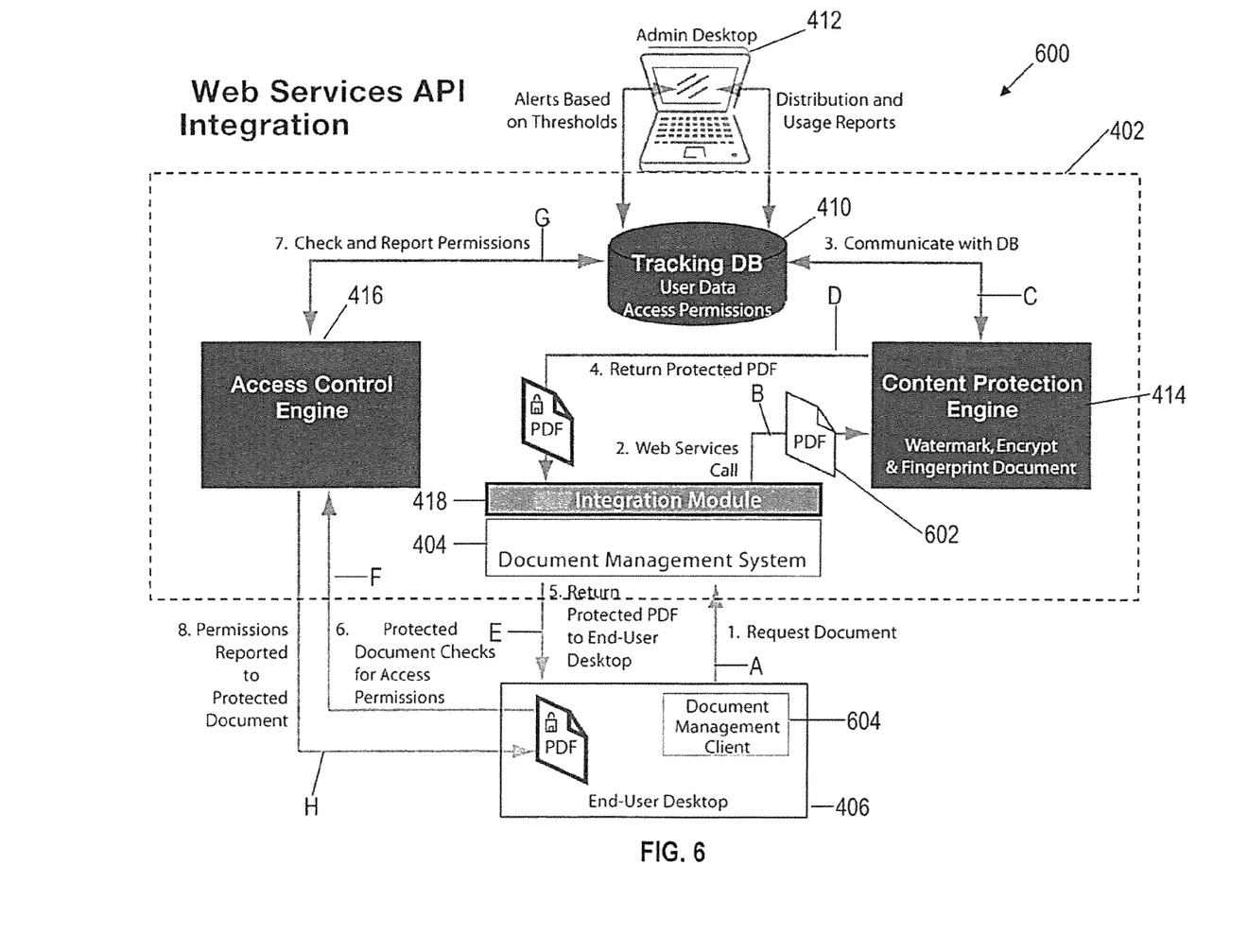
FIG. 6 illustrates functional components for distribution of a document over a network via a client application interfacing a document management system, including protecting the document and detecting distribution and use, deterring unauthorized distribution and use, and disabling distribution and use of the document, according to certain embodiments of the invention.

Referring to FIG. 6, in conjunction with FIGS. 4 and 5, functional processes 600 of various components and steps of the system 400 and method 500 are described. The user computer 406 runs the manager client application to access the document manager 404 and make a request for a protected document or data. The document or other data is available at the data center 402, such as a Portable Document Format file (i.e., PDF or pdf herein) 602 in FIG. 6. The user computer 406, via operation of the manager client application, makes request for the document in a first communication (A) by the computer 406 to the data center 402 over a connected network (not shown in detail, but shown in FIG. 4) or the like. The first communication (A) is received by the document manager 404 of the data center 402.

The document manager 404 obtains the unprotected document per the request, and the integrator 418 intercepts the unprotected document from the document manager 404. The integrator 418 communicates the unprotected document to the protector 414 in a second communication (B). The protector 414 communicates in a third communication (C) with, and operates per policies dictated at, the database 410, to protect the document. Then, in a fourth communication (D), the protected document is returned to the integrator 418 and on to the document manager 404 for distribution per the request.

The protected document is communicated to the document management client of the user computer 406 by the document manager 404 in a fifth communication (E). The fifth communication (E) is made over the network or as otherwise required and per the applicable arrangement for document distribution of the data center 402. On access to the protected document at the user computer 406, the protected document checks for access permissions by a sixth communication (F) of the user computer 406 to the access controller 416 of the data center 402. The sixth communication (F) is similarly made over the network or as otherwise applicable.

In seventh communications (G), the access controller 416 communicates with the database 410 to check and report applicable permissions for the protected document and recipient. The permissions are reported to the protected document in an eighth communication (H) by the access controller 416 to the user computer 406. The eighth communication (H) occurs over the network or other applicable link per the arrangement.

As with the web site implementation of FIGS. 1-3, the system 400, method 500 and functional processes 600 of FIGS. 4-6, respectively, allow for collection and maintenance of distribution and use information for and regarding the protected document. Any further use or distribution of the protected document is likewise registered by the database 410 in order to track and collect relevant information according to the dictated policies for the protected document and distribution system. Modes of communications and pathways for communications and signals vary according to the particular document manager, the user, and the manager client application. The data center 402 comprises devices and processes for handling communications in accordance with the foregoing, as will be understood, and per the document manager 404 for the application. The various aspects of the system 400, method 500 and processes 600 are implemented in software and/or hardware.

An administrator computer 412, or other management device and software for the database 410 and/or pluralities thereof, sets policies and rules for the tracking and usage, as well as the protections that are applied by the content controller 414 to documents accessed through the document manager 404. The administrator computer 412, in conjunction with the database 410, has access to reports, alerts, alarms and other oversight and management controls for the data center 402 and protected documents accessed from the document manager 404. That is, the administrator computer 412 has the document thread for the particular document so accessed, used and distributed, for forensic and distribution controls through detection, deterrence and disablement options. The policies and rules set for the data center 410, and that apply for each particular document thread, are dictated by the database 410, and its operations with the protector 414 and access controller 416, notwithstanding that the document manager 404 operates in usual manner for such application.

The user computer 106 runs the manager client application in order to communicate with the document manager 404 to make request for the document. The manager client application operates in usual manner for such application, and is unaffected/unaltered via the protective elements and operations of the data center 402. The manager client application communicates a request for the document to the document manager 404 per applicable network and client application protocols and commands. The client application, thus, interfaces to the document manager 404 in usual manner, and without impediment from the protective operations.

In operation by a user of the user computer 106, a request is made via the client application for the document from the document manager 404. The document manager 404 operates in usual manner to retrieve the document. The integrator 418, however, intercepts the unprotected document by interfacing with the document manager 404. The integrator 418 communicates the unprotected document to the content protector 414 for applicable protections. The content protector 414 protects the document, and the integrator 418 returns the protected document from the content protector 414 to the document manager 404. The document manager 404, via communications of the client application of the user computer 406, makes the protected document accessible to the user computer 406.

The protected document, via communications of the user computer 106 to the access controller 416 on such access to the protected document, checks access permissions for the protected document with the data center 402. The access controller 416 determines the permissions, in conjunction with the database 410 operations and collection of information of the protected document. The access controller 416 then reports applicable permissions for the protected document to the user computer 406. The user computer 406 is capable of access and use of the protected document per the permissions applicable to the protected document.

If the protected document is further distributed by the end-user computer 406, protections continue with the protected document, and permissions are as dictated by the data center 402. The applicable permissions, in each instance of access and use of the protected data whether by the user computer 406 or others according to the dictated policies of the system, are checked from and reported back by the access controller 416 of the data center 402. Various permissions (or not), per the policies set by the administrator computer 412 for the database 410, are possible for the protected document, according to the implementation and application. The permissions can include limits or restrictions, such as time period limits or the like, including also such as disablement of all or certain use, access or distribution. In every event of use and distribution, the data center 402 tracks and collects information, i.e., the document thread, about the use or distribution and the information is reportable and viewable from the database 410.

Figure 7:
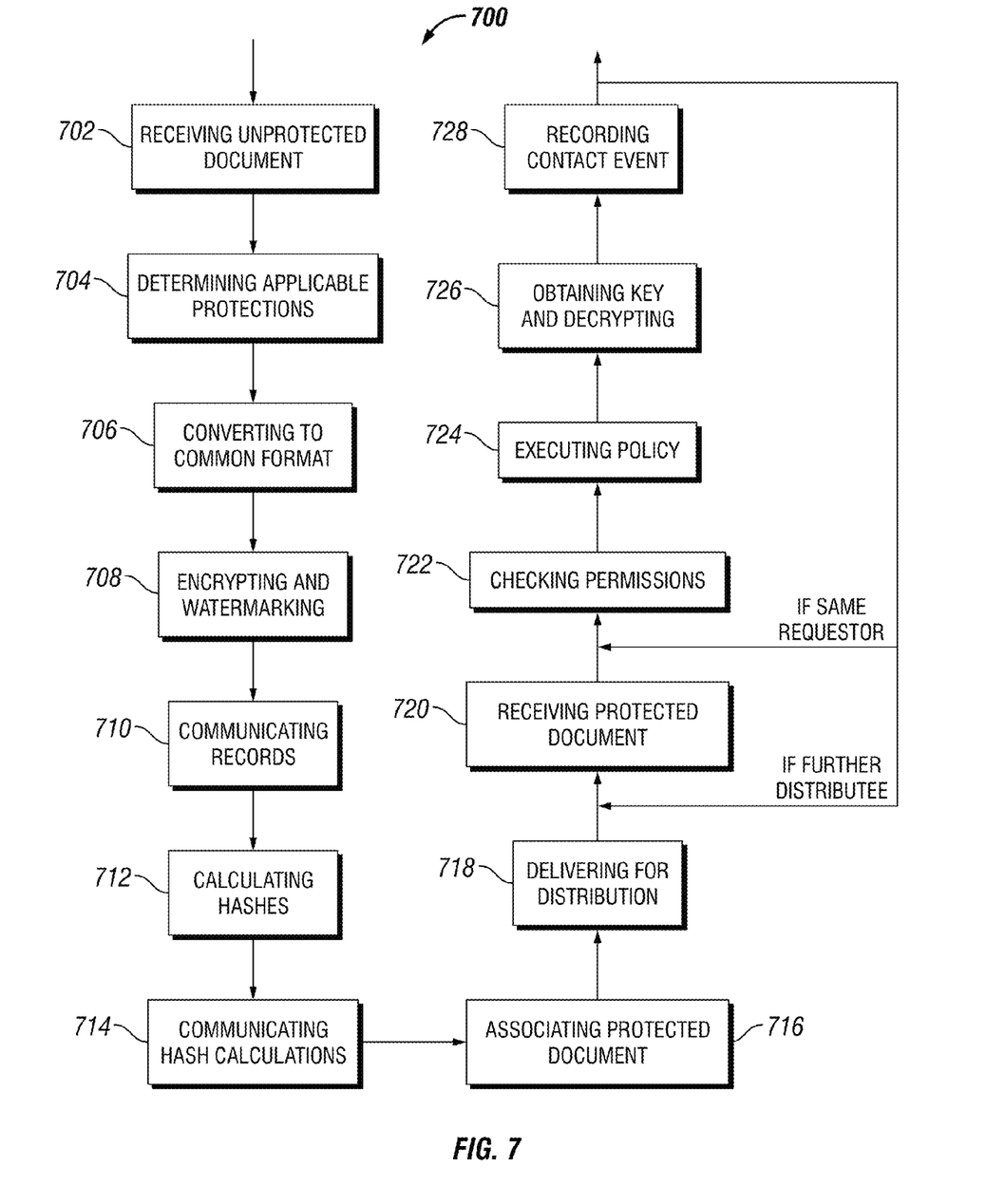
FIG. 7 illustrates a method of protecting a document for distribution, according to certain embodiments of the invention.

Document Protection:

Referring to FIG. 7, a method 700 of protecting a document for which access has been requested from a data center is performed by a content protector, such as the content protector 112, 414 of FIGS. 1 and 3 and of FIGS. 4 and 6, respectively. In a step 702 of the method 700, the content protector receives an unprotected document, which may be a document, file, content, data or the like. The unprotected document is made available to the content protector, such as by a web server or an integration module for a document management system.

In a step 704, the content protector communicates with a database to determine applicable protections to be applied for the unprotected document and for the applicable requester distributee. The database is programmed to dictate rules and policies for the protection implemented by the content protector. The content protector communicates to the database in the step 704 various information regarding the document, the request and the requestor.

The content protector in a step 706 converts the unprotected document to a common format. In a step 708, the content protector encrypts the document in the common format. The content protector also adds a watermark to the document in the step 708. The watermark includes a data center system-generated identifier which the data center is capable of using to identify the requester and a data center system-generated identifier which identifies the document to the data center.

Information regarding the protected document of the step 708 is communicated to a tracking database of the data center in a step 710. The communications in the step 710 include information records of the protected document and related data of the requester and protections applied. A hash of the unprotected document and a hash of the protected document are each calculated by the content protector in a step 712. The respective hash calculations are also communicated to the tracking database in a step 714.

In a step 716, the tracking database associates the protected document with applicable document distribution and use policies, as programmed for the tracking database and implemented by the content protector. The content provider then delivers the protected document for distribution to the requester by other aspects of the data center in a step 718.

The data center makes the protected document available to the requestor in a step 720. The requester receives the protected document in the step 720, as distributed by the data center.

The requester must have or install a decoding/viewing application in order to use and view the protected document in the common format. When the protected document is viewed or otherwise used by the requestor using the decoding/viewing application, the application informs the requester that the document is protected. In order to then view or use the protected document, permissions must be checked in a step 722, such as by a requester computer contacting an access controller of the data center. In the step 722, the decoding/viewing application contacts the access controller of the data center (or other permission authority) to retrieve the document viewing/use policy, and access control permissions per the policies applicable to the protected document and the requestor.

In a step 724, if the viewing/use policy is successfully completed and the policies permit the use by the requestor, the decoding/viewing application contacts the access controller and retrieves a decryption key for the document. The decryption key is communicated by the access controller to the requestor in a step 726. Further in the step 726, the document is decrypted and can be viewed by the requestor.

The access controller makes a record in a step 728 of each contact event by a requester for the protected document, and does so in similar manner as to every other contact event. The record is provided to and maintained by the tracking database in the step 728. If the access controller denies permission for the access, or the viewing/use policy is not executed successfully, the requestor is not provided any decryption key and access to the protected document is denied the requestor. In alternatives, the requester can optionally obtain an access key and manually enter the key, such as through communications through an alternate communication channel (e.g., the requester can contact an administrator of the data center by phone or e-mail and make the access/use request). In every event, the applicable policies for the protected document and the particular requester that obtains the protected document must be satisfied in order to gain access and use of the protected document. In other alternatives, time limits on access to protected documents, restrictions on allowed distributees and others can be set by the data center, such as by denial of permissions and keys as dictated by applicable policies for the protected document and particular requestor.

The foregoing data protections provide detection of access to protected documents, deter unauthorized access because of the protections and contact event record (i.e., the document thread), and further provide disablement opportunities to restrict use and distribution of the document for viewing and manipulation. All of these protections are implemented by virtue of the document knowledge obtained and maintained by the systems and methods as the "document thread".

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for distributing a document over a communication network and tracking a use of the document by one or more recipient device communicatively connected to the communication network, comprising:
   a server communicatively connected to the communication network;
   a database including a data storage communicatively connected to the server, the database includes the document
   a data set stored in the data storage of the database, the data set representing the document and any and each use of the document by any of the one or more recipient device;
   at least one policy contained in the data storage, relative to the data set and either of the document, the use of the document by at least certain of the one or more recipient device, and combinations;
   a content protector, communicatively connected to the database and the server, the content protector obtains from the database the data set and, as dictated by the at least one policy for the data set, watermarks the document as a distributable document and calculates at least one hash of the distributable document, and delivers the distributable document to the server for distribution to the one or more recipient device;
   an access controller, communicatively connected to the database and the server, each respective one of the one or more recipient device communicatively connects to the access controller over the communication network in response to accessing the distributable document by the respective recipient device for the use of the document by the respective recipient device;
   a fingerprint communicated by the respective recipient device to the access controller over the communication network, upon accessing the distributable document by the respective recipient device; and
   wherein the access controller, upon the respective recipient device accessing the distributable document for the use of the document by the device and the access controller receiving the fingerprint from the respective recipient device, calculates, in conjunction with the database, next hash of the distributable document, compares the at least one hash to the next hash, and, if the at least one policy of the database for the respective recipient device so dictates, adds the fingerprint to the data set for the document and the use by the respective recipient device.

2. The system of claim 1, further comprising:
   a web page interface served by the server to the one or more recipient device, each of the one or more recipient device communicatively connects to the web page interface to request the document;
   wherein the distributable document from the content protector is deliverable to each of the one or more recipient device requesting the document via the web page interface.

3. The system of claim 1, further comprising:
   a document manager communicatively connected to the content protector; and
   a client application of the respective recipient device for communicatively connecting the respective recipient device to the document manager to request the document;
   wherein the distributable document from the content protector is obtained by the respective recipient device from the document manager via the client application communicating with the server over the communication network.

4. The system of claim 1, wherein a second device obtains the distributable document from any of the one or more recipient device, further comprising:
   at least one different policy contained in the data storage, relative to the data set for the document and either of the document, the use of the document by the second device, and combinations; and
   a second fingerprint communicated by the second device to the access controller over the communication, upon any access to the distributable document for use by the second device;
   wherein the access controller, upon the second device accessing the distributable document for the use of the document by the device and the access controller receiving the fingerprint from the second device as invoked by the distributable document on access, calculates, in conjunction with the database, another next hash of the distributable document, compares the at least one hash to the other next hash, and, if the at least one policy of the database for the second device so dictates, adds the second fingerprint to the data set for the document and the use by the second device.

5. A method of distribution of a document by a data center to a device in communication with the data center over a communication network, comprising the steps of:
   receiving by a server a document request from the device, the document request includes an identifier of the device and of the document;
   detecting the document request by the server upon the step of receiving;
   communicating the document request to a content protector;
   requesting by the content protector from a database a data set representative of the document and any and each access by the device to the document for use in a process of the device;
   retrieving by the content protector from the database the data set and the at least one policy;
   adding an identifier of the device and the document to the data set, in accordance with the at least one policy;
   watermarking the document as a distributable document, by the content protector based on the at least one policy and the data set;
   calculating by the content protector a hash of the distributable document;
   communicating the distributable document by the content protector to the server;
   providing the distributable document by the server to the device;
   communicating by the device with an access controller if the distributable document at the device is actively accessed by the device for use in a process of the device, invoked by the distributable document when so accessed;

receiving by the access controller a fingerprint communicated by the device to the access controller upon access by the device to the distributable document for use in the process of the device;

calculating by the access controller a next hash of the distributable document responsive to the step of communicating by the device with the access controller on access to the distributable document by the device for use in the process of the device;

comparing by the access controller the next hash to the hash; and adding the fingerprint to the data set for the document and device, if the at least one policy of the database so dictates.

6. The method of claim 5, further comprising the steps of:
serving a web page interface to the device, by a web server connected to the content protector;
delivering the distributable document, in the step of providing the distributable document by the server, to the device via the web page interface.

7. The method of claim 5, further comprising the steps of:
managing a plurality of data sets in the database, each respective data set representative of a respective document for the step of retrieving by the content protector via a document management system connected to the database; and
communicatively connecting a client application of the device to the document management system to control the step of managing in order to selectively provide to the device at least one distributable document from the step of watermarking in respect of at least one of the respective document.

8. The method of claim 5, further comprising the steps of:
providing the distributable document by the device to a second device;
communicating by the second device with the access controller if the distributable document at the second device is actively accessed by the second device for use of the document in a process of the second device, wherein the step of communicating is invoked by the distributable document when actively accessed by the second device for use in the process of the second device;
communicating by the second device to the access controller a second fingerprint upon access by the second device to the distributable document for the process of the second device;
calculating by the access controller another hash of the distributable document responsive to the step of communicating by the second device with the access controller on access to the distributable document by the second device for use in the process of the device; and
adding by the access controller the second fingerprint to the data set for the document and the use by the second device.

9. A method of distribution of a document by a data center to a device in communication with the data center over a communication network, comprising the steps of:
receiving by a server a document request from the device, the document request includes an identifier of the device and of the document;
detecting the document request by the server upon the step of receiving;
communicating the document request to a content protector;

requesting by the content protector from a database a data set representative of the document and at least one policy of the database relative to the data set and the document request;
retrieving by the content protector from the database the data set and the at least one policy;
transforming the data set and the at least one policy by the content protector to yield the document;
protecting the document as a protected document, by the content protector based on the at least one policy;
calculating by the content protector a first hash and a second hash of the protected document;
communicating the protected document by the content protector to the server;
providing the protected document by the server to the device;
communicating by the device with an access controller if the protected document at the device is actively accessed by the device for use in a process of the device, invoked by the protected document when so accessed;
calculating by the access controller a third hash of the protected document responsive to the step of communicating by the device;
comparing by the access controller the third hash to the first hash and the second hash;
retrieving by the access controller, if the device is permitted access to the document for the process as dictated by the at least one policy of the database and the step of comparing, an applicable permission from the database for the protected document, the applicable permission for the protected document uniquely corresponds to the document and the device per the at least one policy, the data set, and the document request;
logging each access to the document by the device, in the database, in response to the step of communicating by the device with the access controller; reporting by the access controller to the device, if permitted by the at least one policy, the applicable permission for the protected document for access to the document by the device for the process of the device;
obtaining by the device from the access controller a key to decode the document at the device, if required by the at least one policy for the document and the device, wherein, after the document is processed by the device, if permitted, the document automatically re-encrypts to the protected document at the device, requiring next applicable permissions for additional access to the document by the device.

10. The method of claim 9, further comprising the steps of:
repeating the steps of communicating with the access controller, retrieving a permission, if any, logging each access, and reporting the permission, if any, for each distinct device obtaining the document and attempting to access the document for a process of the respective device.

11. The method of claim 10, wherein the at least one policy of the database for at least one of the device is different from the at least one policy of the database for another of the device.

12. The method of claim 9, further comprising the step of:
providing a software program stored in memory of the device for communicatively connecting the device to the access controller to perform the step of communicating by the device with the access controller.

* * * * *